April 10, 1962     G. W. McCARTY     3,028,889
OFFSET BLADES FOR RECIPROCATING SAW
Filed Aug. 12, 1960     2 Sheets-Sheet 1
FIG. 1
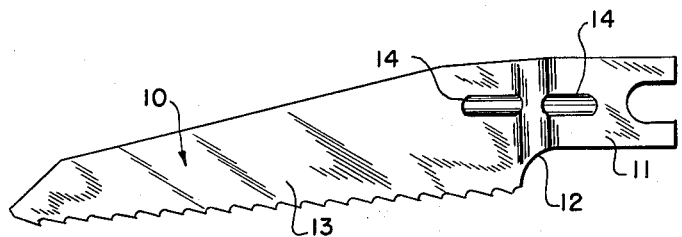
FIG. 2
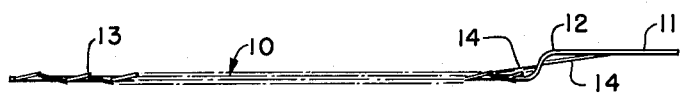
FIG. 4
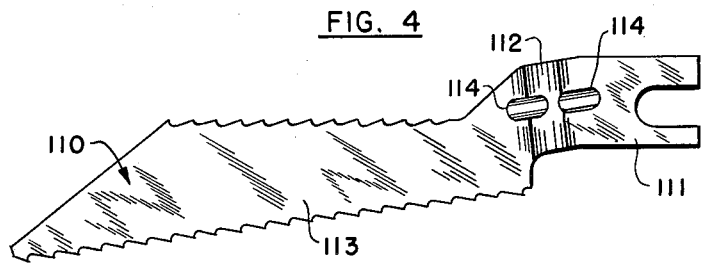
FIG. 5
FIG. 6     FIG. 3
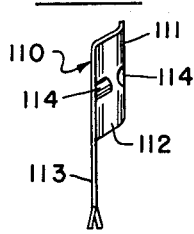 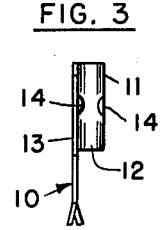
INVENTOR
GEORGE W. McCARTY
BY *Leonard Bloom*
ATTORNEY

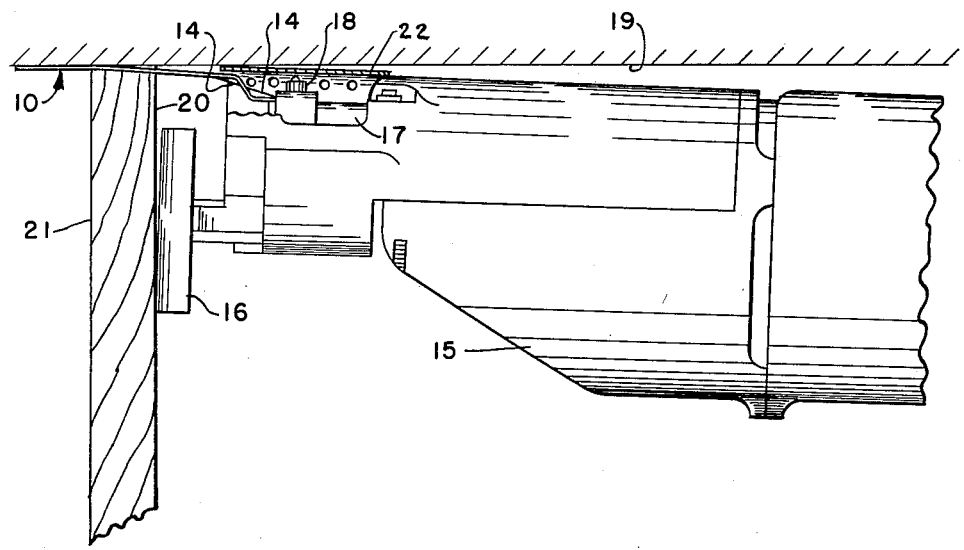
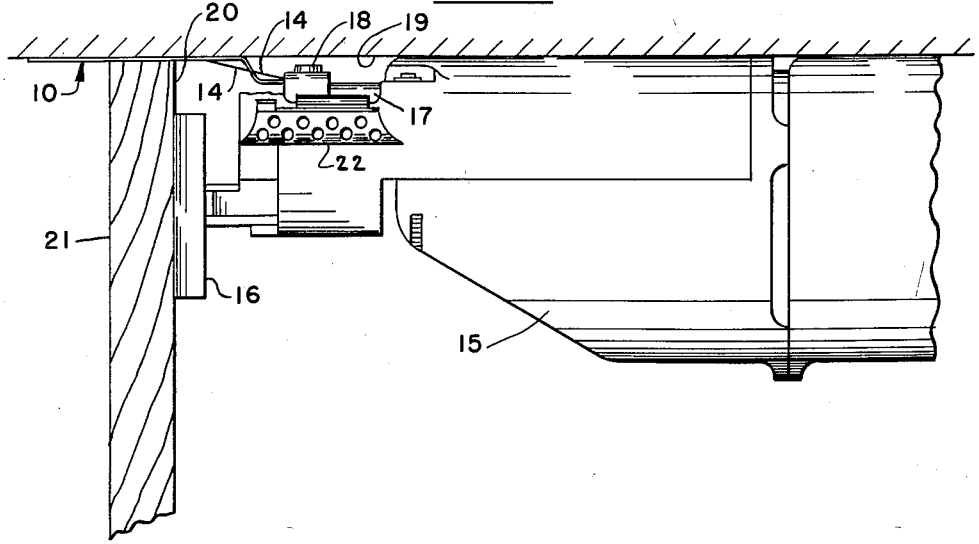

United States Patent Office 3,028,889
Patented Apr. 10, 1962

3,028,889
OFFSET BLADES FOR RECIPROCATING SAW
George W. McCarty, Timonium, Md., assignor to The Black and Decker Manufacturing Company, Towson, Md., a corporation of Maryland
Filed Aug. 12, 1960, Ser. No. 49,373
1 Claim. (Cl. 143—133)

The present invention relates to reciprocating saw blades, and more particularly, to such a reciprocating saw blade which has a portion thereof offset with respect to the plane of the blade.

One of the main uses of a reciprocating saw, either of the hand type or of the power-operated type, is to make a pocket cut or a similar type of cut into a wall or a baseboard; and quite often it is necessary to work in a corner adjacent to a side wall or other similar surface, which ordinarily prohibits bringing the saw blade up close to, that is to say, flush alongside of the work. In the prior art of which I am aware, some power-operated reciprocating saws have been designed and manufactured which include an offset attachment so as to enable the operator to bring the saw blade (and the kerf made thereby) up close to or flush alongside of a surface which is generally perpendicular to the work surface itself. However, this arrangement is not altogether satisfactory, inasmuch as it requires a separate attachment which makes the overall tool somewhat more complicated and hence more clumsy to operate; and naturally, such an attachment is expensive and adds to the cost of the final product.

Accordingly, it is an object of the present invention to alleviate these difficulties by providing an offset blade for a reciprocating saw.

It is another object of the present invention to provide a reciprocating saw blade having a cutting portion thereof and further having a shank portion thereof which is offset with respect to the plane of the cutting portion.

It is a further object of the present invention to provide such an offset reciprocating saw blade which is provided with strengthening dimples or ribs across the intermediate offset portion.

These and other objects of the present invention will become apparent from a review of the following specification taken in conjunction with the enclosed drawings, in which:

FIGURE 1 is a front elevational view of one species of the present invention;

FIGURE 2 is a bottom view thereof showing the set of the cutting teeth;

FIGURE 3 is an end view thereof looking into the point of the blade as viewed from FIGURE 1;

FIGURE 4 is a front elevational view similar in nature to FIGURE 1, but showing another species of the present invention in which there are cutting teeth formed on both of the side edges of the blade;

FIGURE 5 is a bottom view thereof;

FIGURE 6 is an end view thereof looking into the point of the blade as viewed in FIGURE 4; and FIGURES 7 and 8 are views illustrating the inherent utility of the present invention, showing the blade embodiment of FIGURES 1–3 mounted upon a typical power-operated reciprocating saw.

With particular reference to FIGURES 1–3, there is illustrated a reciprocating saw blade 10 which is provided with a shank portion 11, an intermediate portion 12, and a cutting portion 13. It will be appreciated from an examination of the drawings (particularly FIGURE 2) that the shank portion 11 lies in its own particular plane which is offset with respect to the plane of the cutting portion 13. It will also be appreciated that the intermediate portion 12 interconnects the shank portion 11 with the cutting portion 13, and that preferably (but not necessarily) there are a pair of strengthening dimples or ribs 14 formed transversely across the intermediate section 12. These strengthening ribs 14 perhaps may be formed simultaneously with the forming of the offset shank 11; but it is to be understood that the essence of the present invention is not necessarily to be limited thereby, inasmuch as a variety of strengthening means could be employed.

With particular reference to FIGURES 4–6, there is illustrated another species of the present invention in which the reciprocating saw blade 110 is provided with a shank portion 111, an intermediate portion 112 having strengthening ribs 114, and a cutting portion 113 which is provided with suitable teeth formed on each of its side edges; this embodiment might be useful when the offset blade of the present invention is being used to make a series of continuous pocket cuts, as has been described in the co-pending Atkinson et al. application S.N. 41,311 filed July 7, 1960, and assigned to the same assignee as the present invention.

The inherent utility of the present invention will be more clearly appreciated upon an examination of FIGURES 7 and 8. With reference to FIGURES 7 and 8, there is illustrated the forwardmost portion of a conventional power-operated reciprocating saw, such as a sabre saw, which is provided with a suitable gear housing 15, a shoe 16, a reciprocating shaft having a protruding portion 17, and conventional means (indicated generally at 18) for securing the shank portion 11 of the blade 10 to the protruding portion 17 of the reciprocating shaft.

Under ordinary circumstances, and without the benefit of a separate offset attachment to be secured to the forwardmost portion of the sabre saw, it is not possible to make a cut (in the work 21) which is up close to, that is to say, flush alongside of the adjacent perpendicular surface 19. However, by virtue of the paramount feature of the present invention, namely, a blade which itself has an offset portion, it is possible to make a cut which is directly flush alongside of the adjacent surface 19.

Sabre saws of the type illustrated in FIGURES 7 and 8 are provided (preferably) with a suitable guard 22; and it will be understood that sufficient working clearance must be provided for the reciprocating blade 10 so that there will be no interference between the blade 10 and the guard 22. Although the offset feature of the blade 10 enables a cut to be made which is considerably closer to the adjacent surface 19 than is otherwise the case using a conventional straight blade (and for all practical purposes one which is quite sufficient), that nevertheless, it will be further understood that the cut will not be absolutely flush alongside of the adjacent surface 19 unless, of course, the techniques as illustrated in FIGURES 7 and 8 are employed.

It will be seen from an examination of FIGURE 7 that the sabre saw may be tilted or cocked (by a very slight amount) such that the reciprocating saw blade 10 may be slightly bent or curved so as to enable the operator to get directly flush alongside of the adjacent surface 19 (which is perpendicular to the work surface 20) thus assuring a perfect "flush alongside" cut being made into the work 21.

Naturally, this slight tilting of the sabre saw may be employed in conjunction with "straight" blades of the prior art, but obviously, there are physical limits governing the extent to which a blade may be bent; should a large amount of tilting be employed, undue stresses would be placed upon the blade, thus resulting in a hazardous situation. On the other hand, a slight tilting of the sabre saw (using a blade of the prior art) will still not allow a flush alongside cut to be made.

One simple expedient of making an absolute or a perfect flush alongside cut (if desired) without the necessity for tilting the sabre saw by any amount (however slight), is illustrated in FIGURE 8. In FIGURE 8, the guard 22 has been temporarily removed, that is to say, lifted from the normal position illustrated in FIGURE 7; and under such circumstances, the sabre saw may rest perfectly flush alongside of the adjacent surface 19, with the shoe 16 of the sabre saw resting completely flush upon the surface 20 of the work 21. In such a manner, the blade 10 will be allowed to cut into the work 21 at a position which is perfectly flush alongside of the adjacent surface 19. Then, after such a cut has been made, the guard 22 may be lowered and snapped into its normal position, as shown in FIGURE 7.

It will be further appreciated, of course, that the present invention is not necessarily to be confined to these particular modes of operation as illustrated in FIGURES 7 and 8, inasmuch as it will be apparent to those skilled in the art that various lengths of blades may be used having various degrees of lateral offset; and indeed, that the offset itself may be so placed with respect to the length of the blade 10 such as not to interfere with the conventional guard 22. Consequently, it should be realized that in any particular overall design of offset blade and/or sabre saw, it may be possible to hold the sabre saw directly alongside of the work without any canting or tilting being employed; and indeed, it might also be possible to hold the entire saw away from the adjacent perpendicular surface 19 and yet achieve a "flush alongside" cut, provided of course, that a sufficient degree of offset is employed in the intermediate portion 12 of the reciprocating saw blade 10. It will be further understood that the particular relative proportions of offset and length of blade of the species of the present invention (which are illustrated herein) are only for convenience of illustration and clarity of understanding; hence, the scope of the present invention is not necessarily to be limited thereby.

Obviously many modifications may be made without departing from the basic spirit of the present invention. Therefore, it is understood that within the scope of the appended claim, the invention may be practiced other than has been specifically described.

I claim:

For use with a reciprocating saw, an offset blade comprising a flat shank lying in a single plane and having parallel side edges and further having a mounting slot formed therein between said edges, a flat blade portion extending forwardly of said shank and lying in a plane which is parallel to the plane of said shank and offset with respect to the plane of said shank, said blade portion having a top edge which is parallel to said side edges of said shank, said blade portion further having a bottom edge which is angularly offset with respect to said top edge, said top edge being formed along a line which when extended passes through said slot in said shank, said top edge and said bottom edge diverging outwardly of said shank, an intermediate portion integrally connected between said shank and said blade portion, and said intermediate portion having strengthening ribs formed transversely thereof.

References Cited in the file of this patent

UNITED STATES PATENTS

| | | |
|---|---|---|
| 1,898,956 | Harvie | Feb. 21, 1933 |
| 2,714,480 | Harris | Aug. 2, 1955 |
| 2,783,792 | Keesling | Mar. 5, 1957 |

FOREIGN PATENTS

| | | |
|---|---|---|
| 18,618 | Great Britain | Aug. 13, 1914 |
| 208,301 | Switzerland | Apr. 16, 1940 |